(12) United States Patent
Christian et al.

(10) Patent No.: US 12,465,350 B1
(45) Date of Patent: Nov. 11, 2025

(54) EXPANDING DEVICE AND METHOD OF USE THEREOF

(71) Applicants: Aaron Christian, Redwood City, CA (US); Alexander Herbst, Redwood City, CA (US); Michael Abrouk, Redwood City, CA (US); Jay Herbst, Redwood City, CA (US)

(72) Inventors: Aaron Christian, Redwood City, CA (US); Alexander Herbst, Redwood City, CA (US); Michael Abrouk, Redwood City, CA (US); Jay Herbst, Redwood City, CA (US)

( * ) Notice: Subject to any disclaimer, the term of this patent is extended or adjusted under 35 U.S.C. 154(b) by 0 days.

(21) Appl. No.: 18/978,859

(22) Filed: Dec. 12, 2024

Related U.S. Application Data (63) Continuation of application No. 18/757,342, filed on Jun. 27, 2024.

(51) Int. Cl.
*A61B 17/04* (2006.01)
*A61B 17/00* (2006.01)

(52) U.S. Cl.
CPC .......... *A61B 17/0466* (2013.01); *A61B 17/04* (2013.01); *A61B 2017/00477* (2013.01)

(58) Field of Classification Search
CPC ...... A61B 17/0466; A61B 2017/00477; A61B 17/0401; A61B 17/08
See application file for complete search history.

(56) References Cited

U.S. PATENT DOCUMENTS

| | | | |
|---|---|---|---|
| 3,646,615 A * | 3/1972 | Ness | A61F 2/08 606/1 |
| 4,210,148 A | 7/1980 | Stivala | |
| 5,127,412 A * | 7/1992 | Cosmetto | A61B 17/0466 606/232 |
| 5,571,138 A | 11/1996 | Blomqvist et al. | |
| 6,120,525 A | 9/2000 | Westcott | |
| 7,510,566 B2 * | 3/2009 | Jacobs | A61B 17/064 606/215 |
| 7,780,700 B2 * | 8/2010 | Frazier | A61B 17/12122 606/151 |
| 8,585,737 B2 | 11/2013 | Moehrle | |
| 9,034,012 B2 | 5/2015 | Knell | |
| 2004/0254609 A1 * | 12/2004 | Esplin | A61F 2/0811 606/232 |

(Continued)

FOREIGN PATENT DOCUMENTS

| | | |
|---|---|---|
| CN | 113274144 B | 7/2022 |
| GB | 2114894 B | 9/1985 |

*Primary Examiner* — Tan-Uyen T Ho
(74) *Attorney, Agent, or Firm* — Innovent Law P.C.; Karima Gulick

(57) ABSTRACT

A method of expanding skin adjacent to an open wound according to the present disclosure includes steps of providing a first expanding device and a second expanding device; placing the first and second expanding devices on two opposite sides of the wound; coupling the first expanding device, the skin, and the second expanding device with a suture; expanding the skin by pulling the suture to bring the expanding devices toward each other, wherein the expanding devices distribute pulling forces from the suture over the skin and bring the skin toward each other; and releasing the suture to allow the skin to relax.

20 Claims, 11 Drawing Sheets

(56) References Cited

U.S. PATENT DOCUMENTS

| | | | |
|---|---|---|---|
| 2012/0071903 A1* | 3/2012 | Knoell | A61B 17/0466 606/228 |
| 2017/0216016 A1* | 8/2017 | Sengun | A61F 2/0811 |
| 2018/0325520 A1* | 11/2018 | Pizanias | A61B 17/085 |
| 2020/0121311 A1* | 4/2020 | Umar | A61B 17/0466 |

* cited by examiner

EXPANDING DEVICE AND METHOD OF USE THEREOF

BACKGROUND OF THE INVENTION

1. Field of the Invention

The present invention relates to a surgical aid and more particularly relates to a device for expanding or expanding skin for the purpose of facilitating a difficult closure of open wounds which are routinely encountered in general surgical fields.

2. Description of the Related Art

Sutures are stitches used to close open wounds and/or surgical incisions of a patient. A medical practitioner generally uses a needle with an attached suture to substantially sew two adjacent sections of skin together to close the wound or incision, Surgical knots are often used to secure the sutures and ensure proper healing. Sutures and surgical knots contacting the skin can be inflammatory and/or become "ingrown" and actually impede healing of the wound or incision. Additionally, complications may arise if the suture is tied too tightly or too loosely. Moreover, traditional techniques may leave unsightly "track marks."

Closure may be difficult, especially in high-tension areas of the skin, where skin overlies the shoulder, knee, angle of the mandible, etc. Wound eversion occurs when the two wound surfaces are horizontally opposed into one another such that the closed incision is under no tension and topographically lies in a plane above the resting horizontal skin plane. Wound closures with maximal eversion resist excessive widening of the scar due to ongoing ambient stresses in the high-tension area during the wound healing and scar maturation processes. However, wound eversion can be technically difficult to achieve for less skilled operator, and a device to facilitate wound eversion is desirable.

Further, there may be excessive tension on closures where an excisional defect is present in the skin. When suture is placed under excessive tension to close such wounds, the suture itself can slice through the skin ("cheese wiring").

Thus, there exists a need for suture devices that improve upon and advance the known suturing and dressing techniques.

BRIEF DESCRIPTION OF THE DRAWINGS

It should be noted that the drawing figures may be in simplified form and might not be to precise scale.

DETAILED DESCRIPTION OF THE INVENTION

The embodiment and various other embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

The present disclosure relates to the system and method of tensioning skin edges adjacent to an open wound (in an adjustable controlled manner) for the purpose of expanding them or bringing them closer to each other and thereby effecting a less difficult and/or more rapid wound closure.

Figure 1:
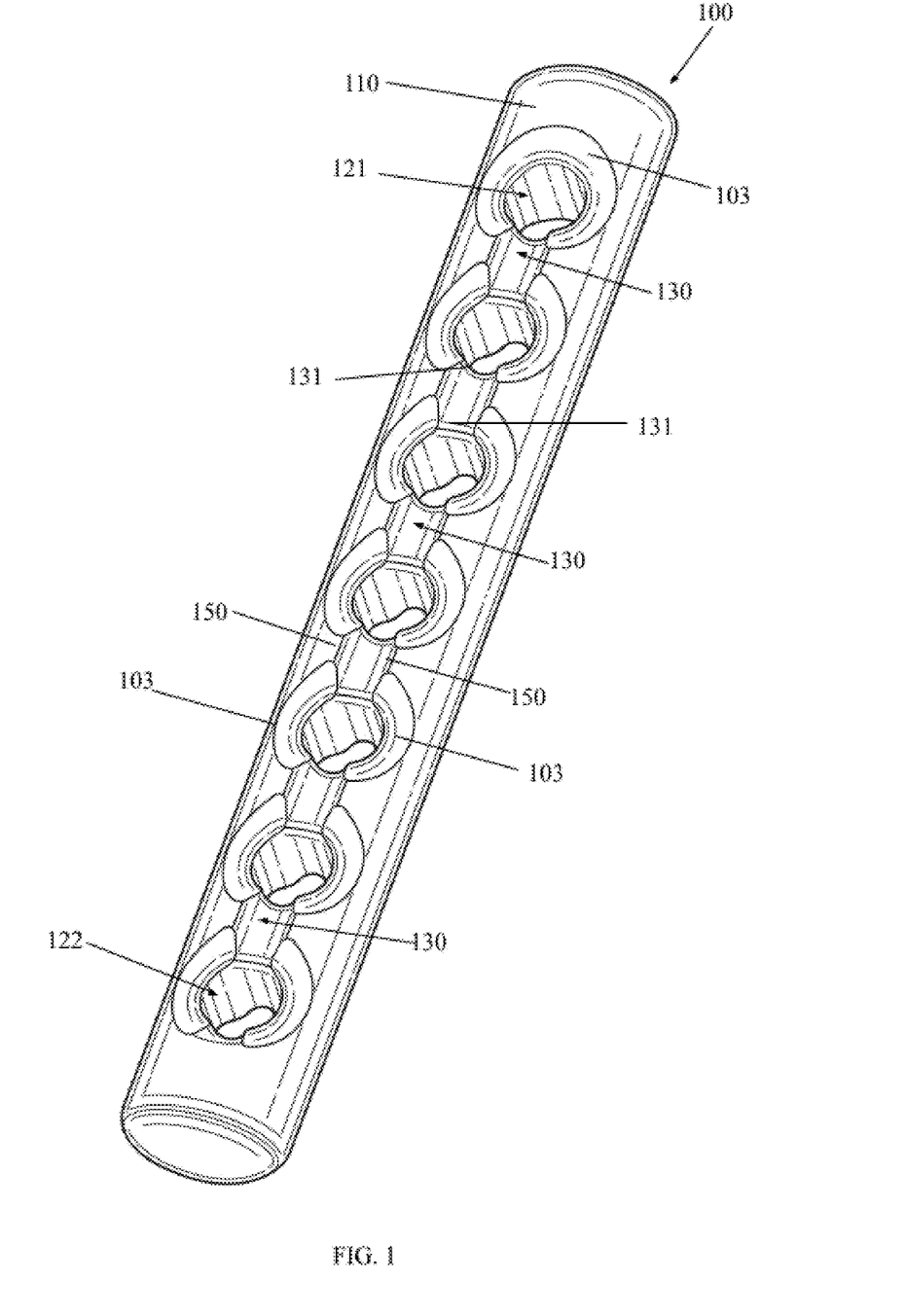
FIG. 1 is a perspective view of the expanding device according to a first embodiment of the present disclosure.
Figure 2:
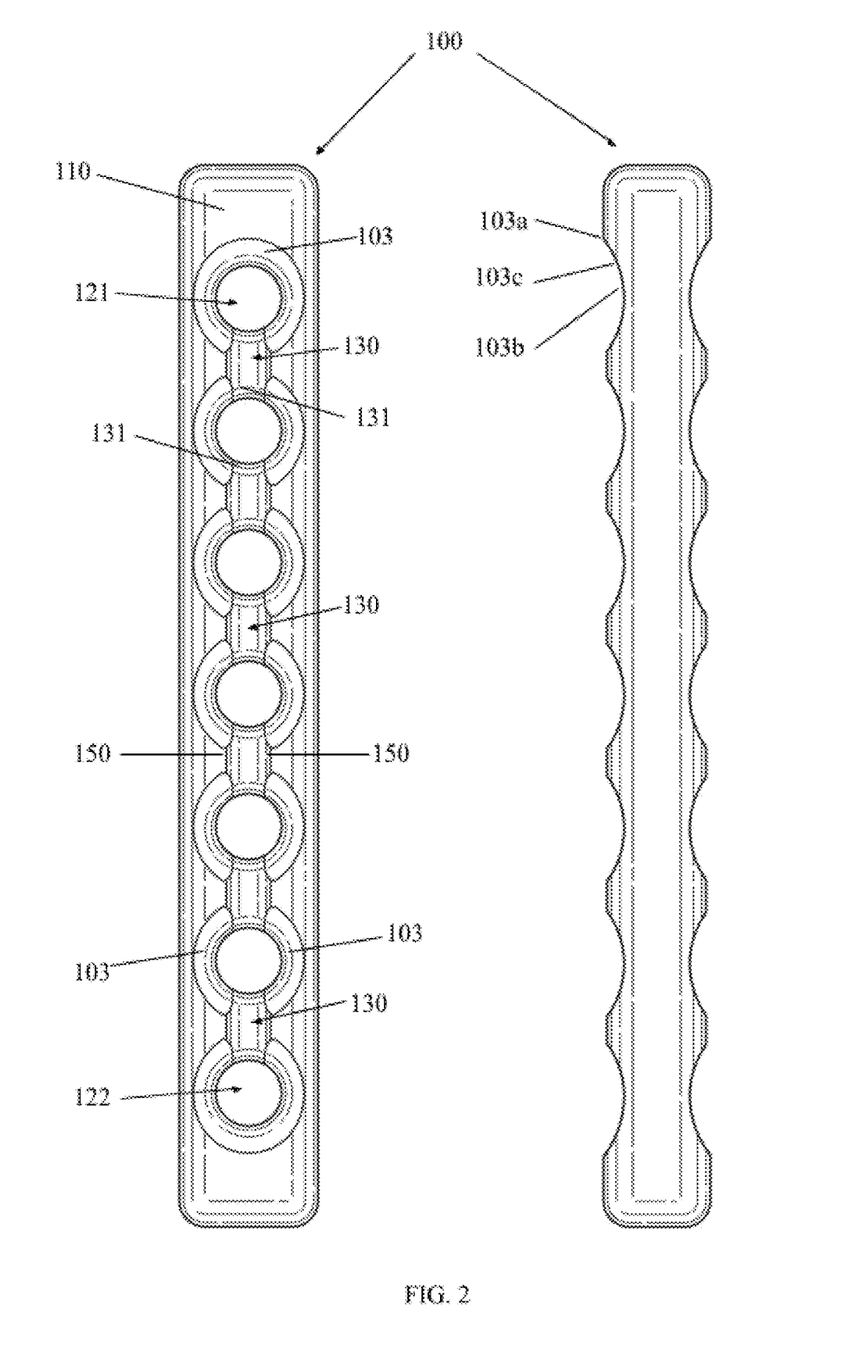
FIG. 2 includes a top and a side view of two expanding devices according to the first embodiment of the present disclosure.

FIG. 1 is a perspective view and FIG. 2 is a side view of the expanding device 100 according to a first embodiment of the present disclosure. The expanding device 100 includes a body 110 and a plurality of holes formed along the length of the body 110. More specifically, the expanding device 110 includes a first hole 121 and a second hole 122 that a suture can pass through. In the present embodiment, the body 110 is symmetrical and has two opposite sides that mirror each other. On the other hand, every one of the holes is formed throughout the body 110 and thus a suture can enter one hole from one side of the body 110 and exits the same hole from the opposite side of the body 110.

The expanding device 100 further includes a plurality of sunken grooves 130 also formed along a portion of the length of the body 110, wherein each groove 130 is formed between two adjacent holes on one side of the body 110. Further, each groove 130 includes a pair of curved corners 131 formed on two ends of the groove 130.

The expanding device 100 further includes a plurality of teeth portions 150 protruding from both sides of the expanding device 100 and away from the body 110. The teeth portions 150 are configured to dig into the skin of the patient when a force is applied on the expanding device 100 to push said device 100 and its teeth portions 150 toward the skin.

The expanding device 100 also includes a plurality of funnel portions 103 formed adjacent to each hole on both sides of the body 110. The function of the funnel portion 103 is to guide a suture into the corresponding hole. In the first embodiment, the funnel portion 103 has a generally circular or C-shaped top section 103a, a narrow bottom section 103b, and a slope 103c between the top and bottom sections 103a-b.

In the first embodiment, the expanding device 100 is made of plastics using molding methods such as injection molding or other method for shaping liquid or pliable plastic material. In different embodiments, the expanding device 100 can be made of metallic material using molding methods such as casting, forging, or other method for shaping liquid or pliable metallic material. The expanding device 100 can also be machined from bulk or billeted metallic material by continuous casting, hot rolling, or other conventional methods.

Figure 3:
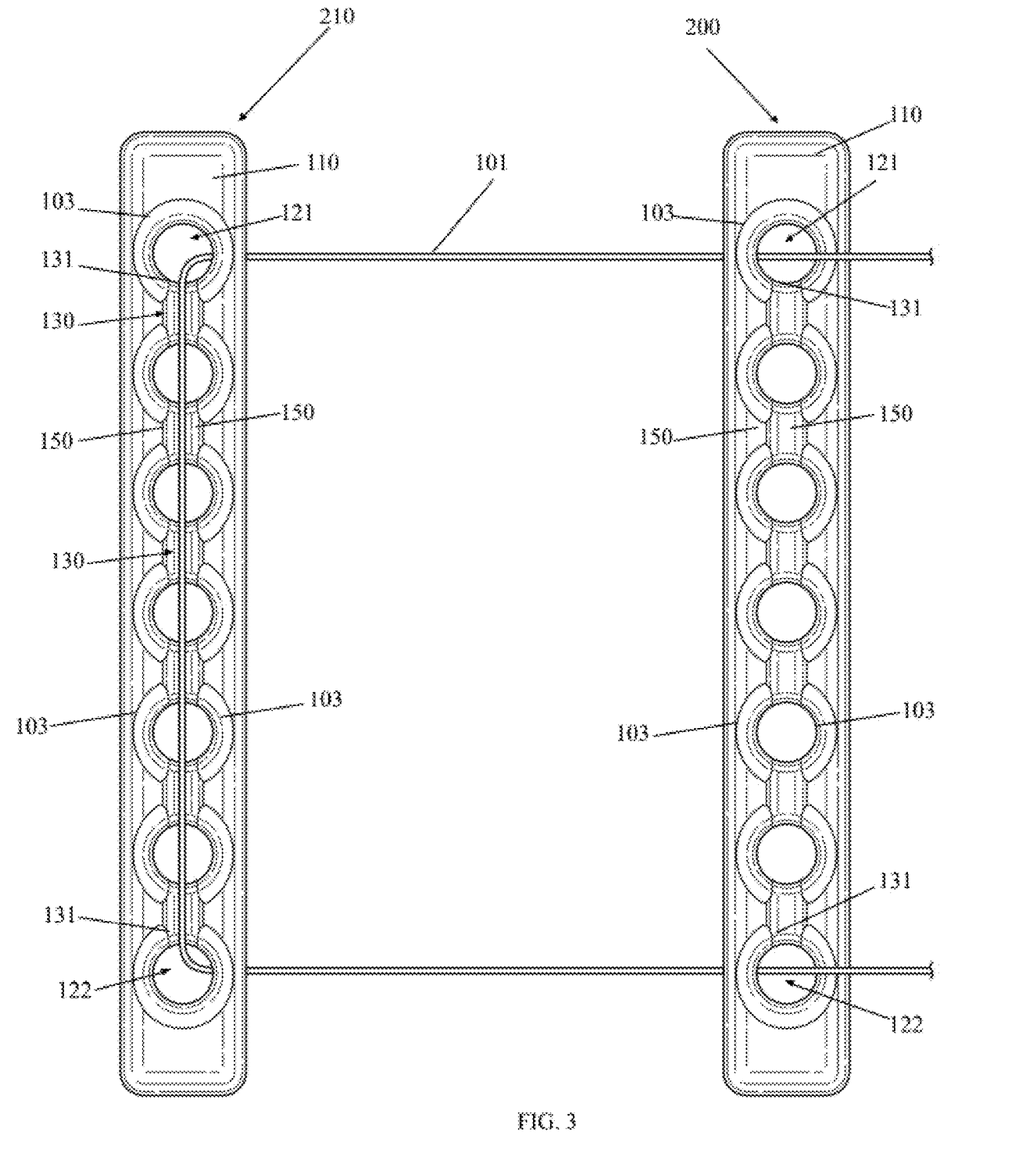
FIG. 3 is a top view of a skin expanding system according to a second embodiment of the present disclosure.

FIG. 3 is a top view of a skin expanding system according to a second embodiment of the present disclosure. The skin expanding system includes a first device 200, a second device 210, and a suture 101. The first and second devices 200, 210 are identical to the expanding device 100 discussed above and illustrated in FIGS. 1 and 2. As illustrated in FIG. 3, the suture 101 passes through the first hole 121 of the first device 200 from one side of the first device 200 and exits the same first hole 121 from the opposite side of the first device 200. The suture 101 then passes through the first hole 121 of the second device 210 from one side of the second device 210 and exits the same first hole 121 from the opposite side of the second device 210.

Afterward, the suture 101 is bent around the curved corner 131 adjacent to the first hole 121, passes through multiple sunken grooves 130 of the second device 210, is bent around the curved corner 131 adjacent to the second hole 122, enters the second hole 122 of the second device 210, and exits the same second hole 122 from the opposite side of the second device 210. The curved corners 131 are in contact with two bent portions of the suture 101 to ensure that the bent portions are curved so that the tension is never concentrated at any specific point of the suture 101 to avoid suture breakage/snapping when the suture 101 is later pulled by the surgeon.

Finally, the suture 101 returns to the first device 200 to enter the second hole 122 of the first device 200 and exits the same second hole 122 from the opposite side of the first device 200. Now two ends of the suture 101 are located on the same side of the first device 200. The suture 101 now couples the first and second devices 200, 210 and allows the surgeon to bring the second device 210 toward the first device 200 by pulling the suture 101.

Please note that the sunken grooves 130 of the second device 210 receives and retain portions of suture 101 on the second device 210. Further, the grooves 130 are oriented in a linear fashion and configured to make sure that the suture 101 extends in a straight line and no part of the suture 101 goes over the teeth portions 150 when pulled by the doctor.

In the embodiment illustrated in FIG. 3, the suture 101 enters the same holes on the first and second devices 200, 210. However, please note that the suture 101 does not have to enter the same holes on the first and second devices 200, 210. Any two holes of the first and second devices 200, 210 may be used to couple the devices 200, 210 together, wherein non-symmetric use of the holes allows the surgeon to control the direction of tension on the skin.

Figure 4:
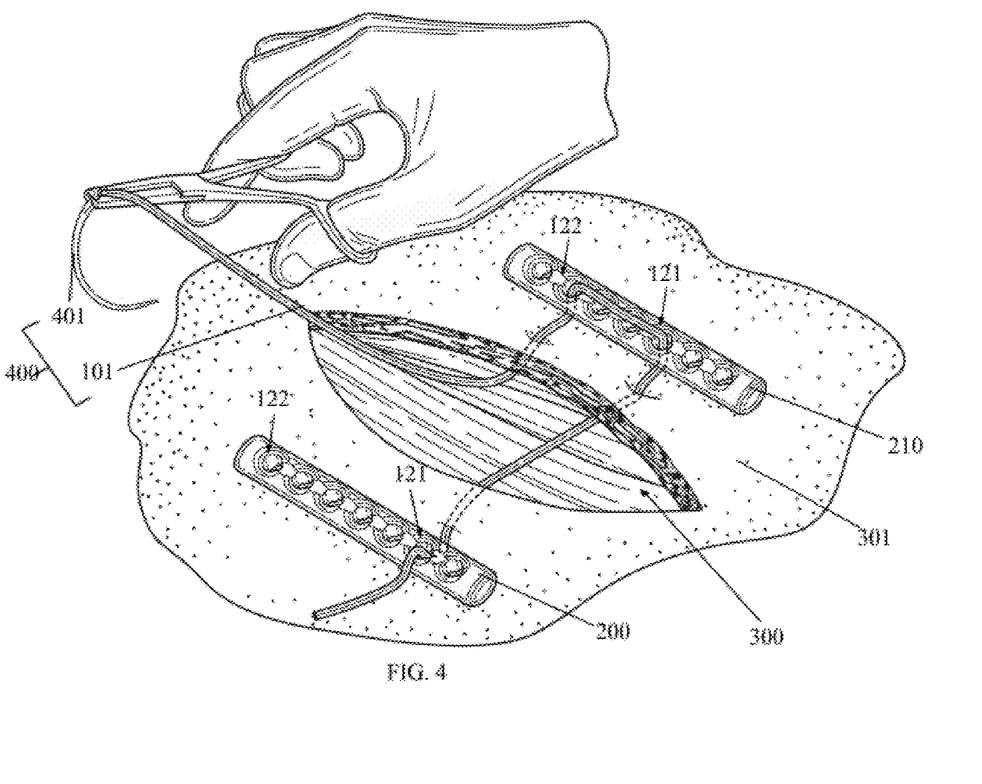
FIG. 4 is a perspective view of the skin expanding system according to the second embodiment used to expand skin surrounding an open wound.

FIG. 4 is a perspective view of the skin expanding system according to the second embodiment used to expand tissues surrounding an open wound 300 to facilitate the difficult closure thereof. Firstly, the skin expanding system includes a first device 200, a second device 210, a needle-suture combination 400. The needle-suture combination 400 includes a suture 101 and a needle 401 having a sharp end and a connection end coupled with the suture 101. The skin expanding system is deployed before closure of the open wound 300 to mechanically put the skin 301 surrounding the open wound 300 under force or tension in order for the skin 301 to stretch (creep). Mechanical creep occurs quickly (intraoperatively), within minutes to hours, and results in stretching or lengthening of the skin 301 because of the breakdown of the dermal framework. The skin expanding system allows large amounts of force to be applied to skin 301 for the purposes of achieving mechanical creep and stress-relaxation of skin 301 surrounding a wound without tearing the skin 301 or damaging the wound edges. One can think of the skin expanding system like a snowshoe. Without a snowshoe, a person walking through deep snow with snow boots would sink into the snow. With the snowshoe, the boot's surface area is increased thereby decreasing the pressure of the boot on the snow, allowing the person to walk on top of the snow.

As illustrated in FIG. 4, the first and second devices 200, 210 are disposed on two opposite sides of the open wound 300. To couple the two devices 200, 210, the needle-suture combination 400 first enters the first hole 121 of the first device 210 from one side and exits from the opposite side. The needle-suture combination 400 then pierces the skin 301 below the first device 200, moves across the open wound 300, and then pierce the skin 301 below the second device 200 to enter the first hole 121 of the second device 210 and exits from the opposite side of the second device 210. Afterward, the suture 101 is bent to enters the second hole 122 of the second device 210 and exits from the opposite side to pierce the skin 301 below the second device 210. The needle-suture combination 400 then moves across the open wound 300 back to the first device 200 to pierce the skin 301 below the first device 200. Lastly, the needle-suture combination 400 enters the second hole 122 of the first device 210 so that two ends of the needle-suture combination 400 are located on the same side of the first device 210. Now the surgeon can pull two ends of the needle-suture combination 400 to bring the second device 220 toward the first device 210 and expand the skin 301 surrounding the open wound 300.

Figure 5:
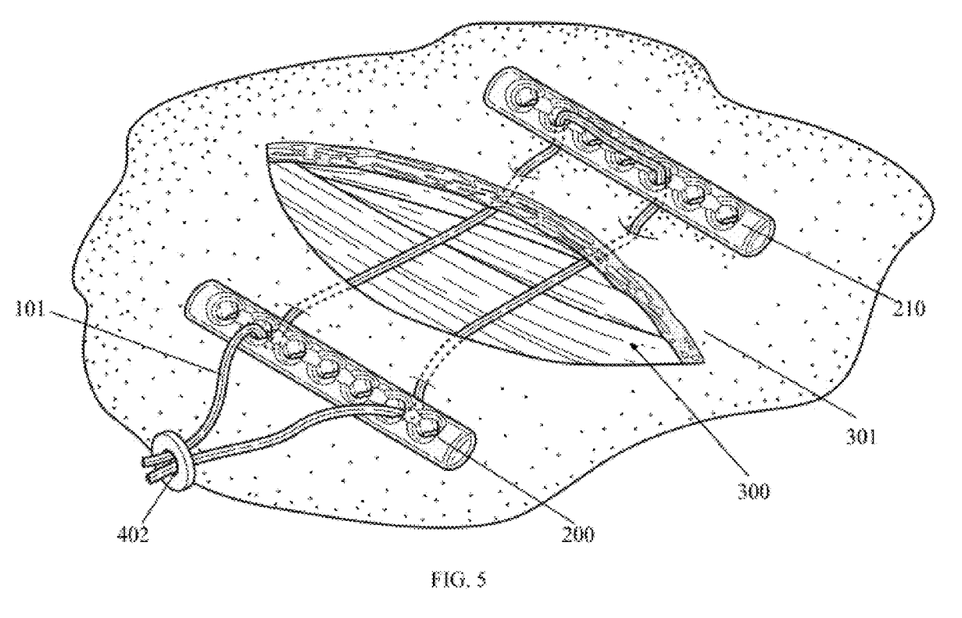
FIGS. 5-7 are perspective views of the skin expanding system according to the second embodiment during different stages of the skin expanding procedure.
Figure 6:
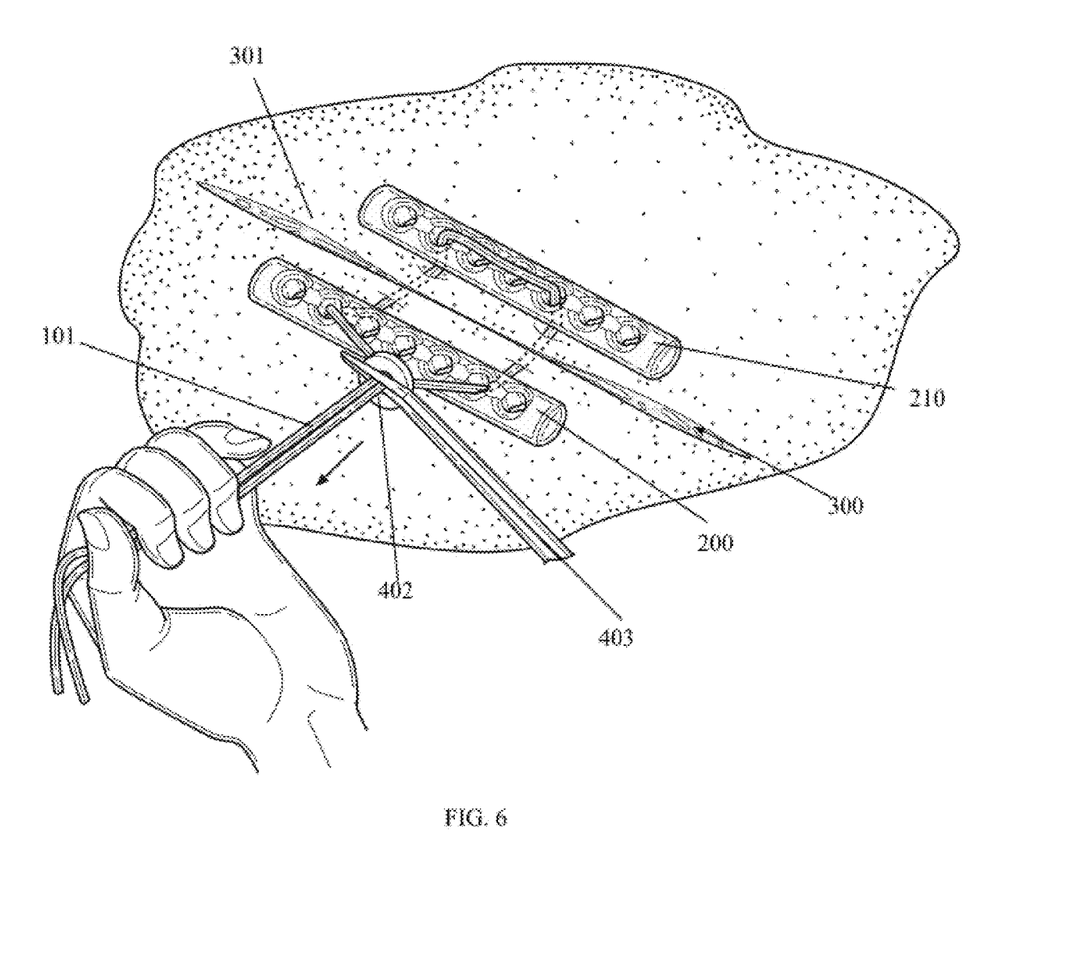
Figure 7:
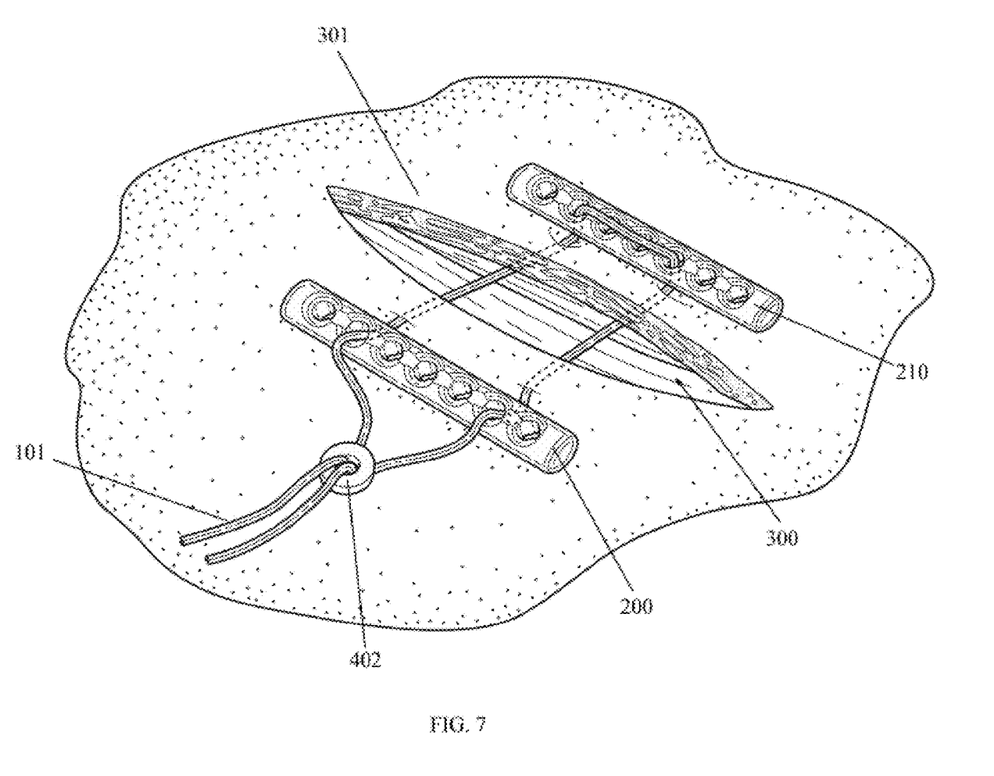

FIGS. 5-7 are perspective views of the skin expanding system according to the second embodiment at different stages of the skin expanding procedure. As illustrated in FIGS. 5-7, the skin expanding system is coupled with the skin 301 surrounding the open wound 300. The needle 401 is removed from the needle-suture combination 400 which is now left with only the suture 101. The skin expanding system further includes a washer 402 configured to receive two ends of the suture 101 as illustrated in FIG. 5. The washer 402 collects two end portions of the suture 101 and groups them in one string which allows the surgeon to pull the two end portions with one hand to bring the second device 210 toward the first device 200. Preferably, the surgeon pushes the first device 200 downward as he/she is pulling the suture 101, in order for the teeth portions 150 (not illustrated) of the first device 200 to grip into the skin 301 to prevent the first device 200 from slipping. On the other hand, as the second device 210 is being pulled by the suture 101 toward the first device 200, the second device 210 is also preferably pushed downward for its teeth portions 150 (not illustrated) to grip into the skin 301 to prevent the second device 210 from slipping. Further, the pulling force from the suture 101 is transformed to a pressing force (by the second device 210) on the skin 301, wherein the second device 210 uniformly distributes the pressing force over the skin 301 for having an elongated and straight body.

Also, as illustrated in FIG. 6, the washer 402 groups two end portions of the suture 101 so that the surgeon pull the suture 101 with one hand and use the other hand to use a surgical clamp 403 to clamp said end portions. The surgical clamp 403 maintains the tension of the suture 101 to keep stretching the skin 301 surrounding the open wound 300. Please note that the washer 402 is used in the second embodiment to group the end portions of the suture 101 in one string and facilitate tensioning thereof by the surgeon. However, in different embodiments, the surgeon can also manually group the end portions in one string with his/her own hand without the use of the washer 402 or other comparable devices. Further, it is preferable to maintain the tension in the suture 101 using the surgical clamp 403 or other method/device for at least several minutes before releasing in order to give the skin 301 enough time to undergo the tension exerted by the skin expanding system and the surgeon.

As illustrated in FIG. 7, the surgeon has released the suture 101 as well as the tension on the skin 301 surrounding the open wound 300. Thus, the skin 301 can now relax and return to its original position as illustrated in FIGS. 4-5. However, the same skin 301 has expanded under tension previously exerted by the skin expanding system and the surgeon. Mechanical creep has now occurred which results in stretching or lengthening of the skin 301 because of the tension on the skin 301 from the device 200, 210 and the suture 101 stretches and aligns collagen and elastic fibers in the skin 301. Thus, as illustrated in FIG. 7, even when the surgeon is no longer pulling the suture 101, the area of the open wound 300 has decreased due to the now expanded skin 301. However, there is still significant gap between edges of the open wound 300. Thus, it is preferable for the surgeon to pull the suture 101 again to return the skin expanding system and the skin 301 back to the position illustrated in FIG. 6. It is also advisable to maintain the tension in the suture 101 again for at least several minutes before releasing in order to give the skin 301 enough time to undergo the tension exerted by the skin expanding system and the surgeon. To adequately stretch and expand the skin 301 to facilitate the wound closure later, it is advisable to repeat the tension/relaxation process discussed above several times before attempting the close the open wound 300, to ensure that the wound dehiscence is adequately reduced for the surgeon to properly stitch the wound in order to avoid wound separation and facilitate the healing thereof.

Please note that the suture 101 in FIGS. 4-7 does not enter the same holes on the first and second devices 200, 210. In different embodiments, any two holes of the first and second devices 200, 210 may be used to couple the devices 200, 210, wherein non-symmetric use of the holes allows the surgeon to control the direction of tension on the skin.

Figure 8:
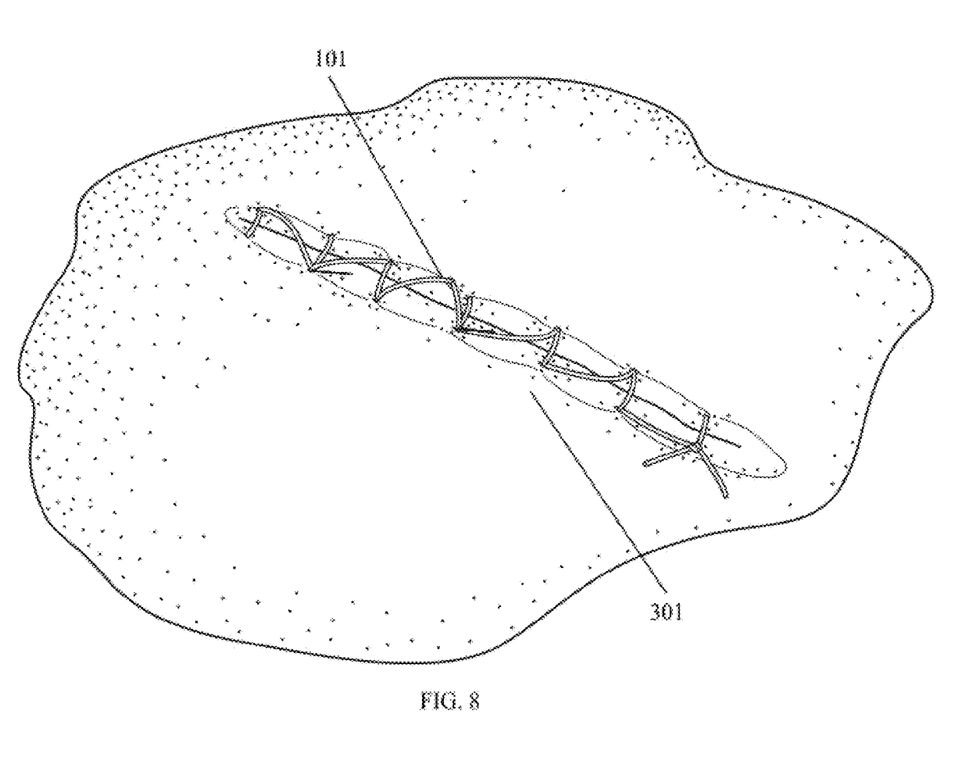
FIG. 8 is a perspective view of the closed wound after the surgeon has adequately expanded the skin.

FIG. 8 is a perspective view of the closed wound after the surgeon has used the skin expanding system to adequately expanded the skin 301 adjacent to the previous open wound 300. In the embodiment illustrated in FIG. 8, the skin expanding system is removed before the surgeon starts closing the wound using another set of suture. In the embodiment illustrated in FIG. 9, even after the wound is closed, the surgeon can keep using the existing skin expanding system to maintain the tension in the skin 301 to minimize the wound dehiscence. The surgeon can then remove the skin expanding system once he/she is confident that the wound is properly closed.

Figure 9:
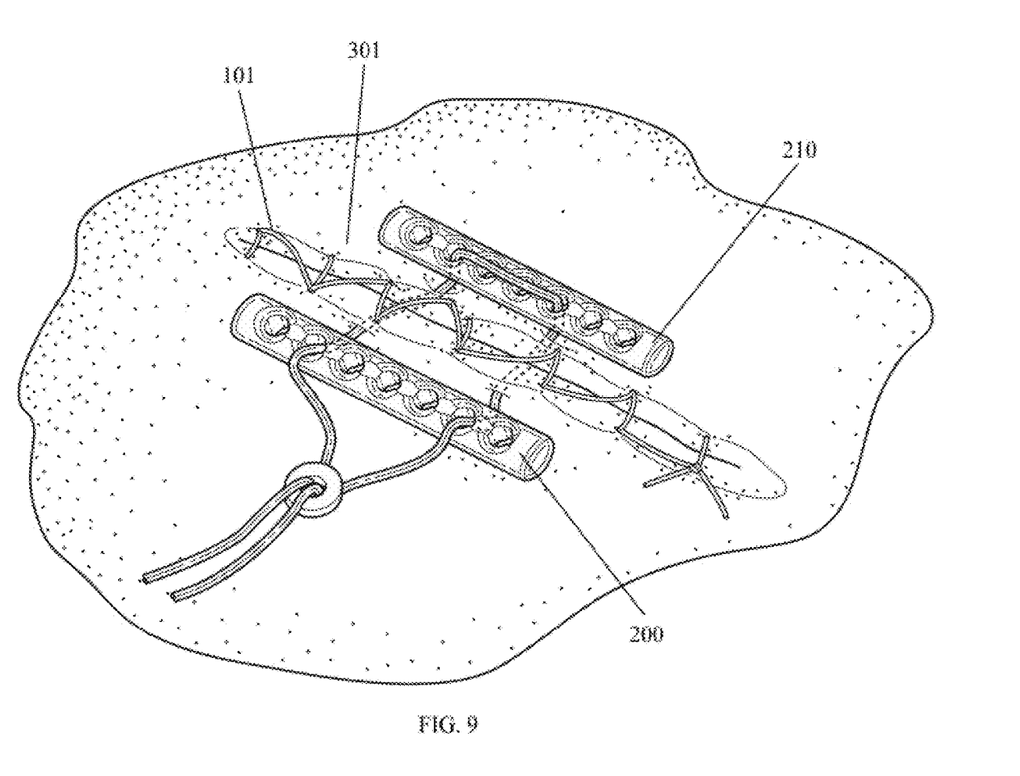
FIG. 9 is another perspective view of the closed wound after the surgeon has adequately expanded the skin.
Figure 10:
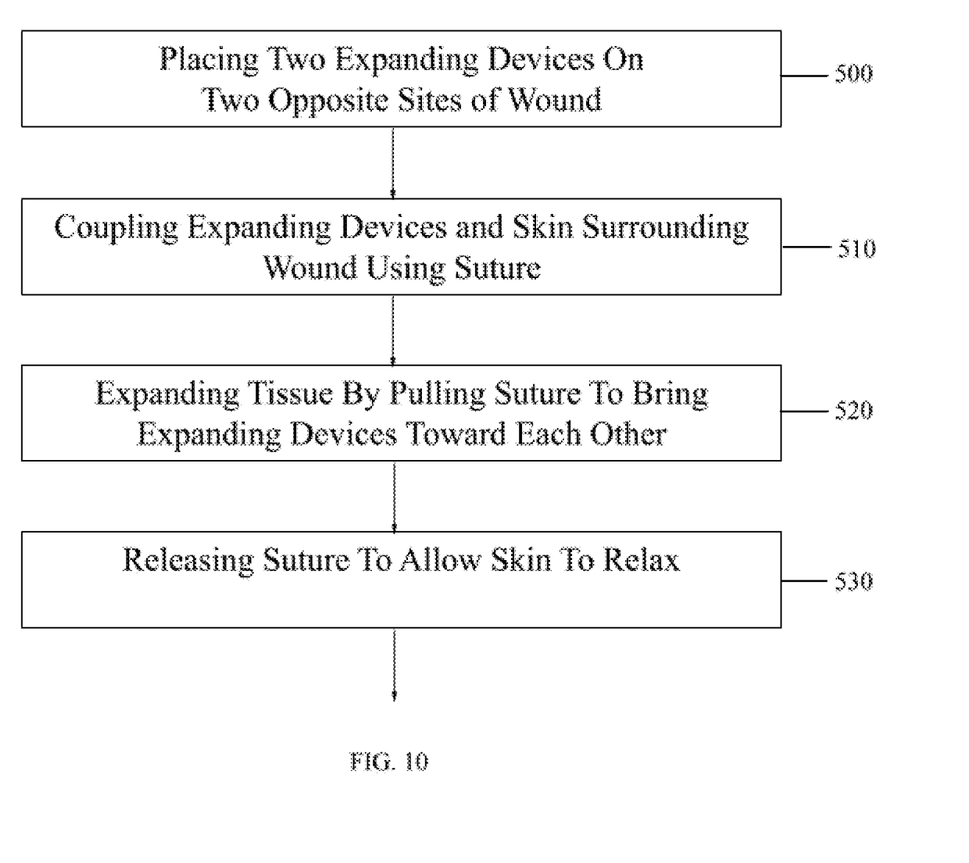
FIG. 10 is a flow chart of a method of expanding tissues surrounding an open wound according to a third embodiment of the present disclosure.

FIG. 10 is a flow chart of a method of expanding tissues surrounding an open wound according to a third embodiment of the present disclosure. The method includes step 500 of placing two skin expanding devices on two opposite sides of an open wound. The skin expanding devices are identical to the expanding devices discussed above and illustrated in FIGS. 1-9. The skin expanding devices include an elongated body having a plurality of holes. The expanding device further includes a plurality of grooves formed along the length of the body, wherein each groove is formed between two adjacent holes on one side of the body. Further, each groove includes a pair of curved corners formed on two ends of the groove. Further, the expanding device also includes a plurality of teeth portions protruding from either the first side or second side and away from the body. The teeth portions are configured to contact the skin around an open wound and dig into the skin when the expanding device is pulled by the doctor toward the skin using the suture.

In the third embodiment, the two skin expanding devices have the same length and have the same number of holes as illustrated in FIG. 3. However, in different embodiments, the skin expanding devices can have different length and different number of holes depending on the factor such as the shape and dimensions of the open wound.

The method further includes step 510 of coupling skin expanding devices and skin surrounding the open wound using suture. Here please also refer to FIG. 4 for illustration. The method aims to mechanically put the skin surrounding the open wound under force or tension in order for the skin to stretch (creep). Mechanical creep occurs quickly (intraoperatively), within minutes to hours, and results in stretching or lengthening of the skin because of the breakdown of the dermal framework. The skin expanding system allows large amounts of force to be applied to skin for the purposes of achieving mechanical creep and stress-relaxation of skin surrounding a wound without tearing the skin or damaging the wound edges. One can think of the skin expanding system like a snowshoe. Without a snowshoe, a person walking through deep snow with snow boots would sink into the snow. With the snowshoe, the boot's surface area is increased thereby decreasing the pressure of the boot on the snow, allowing the person to walk on top of the snow.

As mentioned above, the two skin expanding devices are disposed on two opposite sides of the open wound. A needle-suture combination first enters a first hole of a first expanding device from one side and exits from the opposite side. The needle-suture combination then pierces the skin below the first expanding device, moves across the open wound, and then pierce the skin below the second expanding device to enter a first hole of the second expanding device from one side and exits from the opposite side of the second expanding device.

Afterward, the needle-suture combination is bent to enters a second hole of the second expanding device from one side and exits from the opposite side to pierce the skin below the second expanding device. The needle-suture combination then moves across the open wound back to the first expanding device to pierce the skin below the first expanding device to enter a second hole thereof. Lastly, the needle-suture combination passes through the second hole of the first expanding device so that two ends of the needle-suture combination are located on the same side of the first expanding device.

Now the surgeon can perform step 520 of pulling said two ends of the needle-suture combination to bring the second expanding device toward the first expanding device and expand the skin surrounding the open wound in the process. Step 520 further includes removing the needle from the needle-suture combination (which is now left with only the suture) and using a washer to collect two end portions of the suture and groups them in one string as illustrated in FIGS. 5-6. Now the surgeon can pull the two end portions with one hand to bring the second expanding device toward the first expanding device.

Last but not least, the method includes step 530 of releasing the suture to also release the tension in the skin surrounding the open wound. The skin can now relax and return to its original position as illustrated in FIGS. 4-5. However, the same skin has expanded under tension previously exerted by the skin expanding system. Mechanical creep has now occurred which results in stretching or lengthening of the skin because of the breakdown of the dermal framework. Thus, even when the surgeon is no longer pulling the suture, the area of the open wound has decreased due to the now expanded skin. Please refer to FIGS. 5 and 7 to see the difference in wound dehiscence before and after skin expansion procedure. This complete the first round of expanding skin or skin surrounding an open wound using the suture and expanding devices of the present disclosure.

Figure 11:
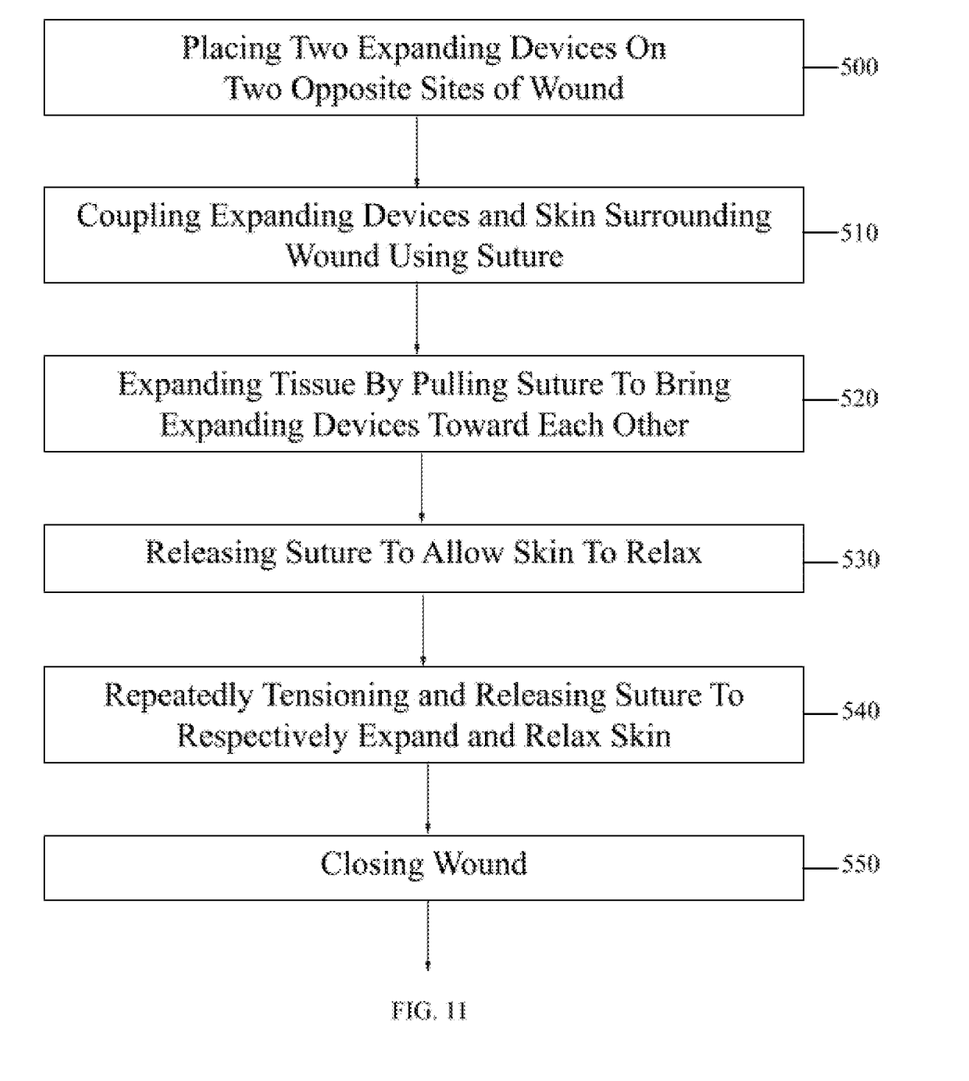
FIG. 11 is a flow chart of a method of closing an open wound according to a fourth embodiment of the present disclosure.

FIG. 11 is a flow chart of a method of closing an open wound according to a fourth embodiment of the present disclosure. The method also includes steps 500-530 of expanding skin surrounding an open wound using the suture and expanding devices of the present disclosure. As illustrated in FIG. 7, there is still significant gap between edges of the open wound after the first round of expanding skin from steps 500-530 has ended. Thus, the method further includes step 540 of repeatedly tensioning and releasing suture to expand and relax the skin. To adequately stretch and expand the skin to facilitate the wound closure later, it is advisable to repeat the tension/relaxation process discussed above several times before closing the open wound. This ensures that the wound dehiscence is adequately reduced for the surgeon to stitch the wound, avoid wound separation, and facilitate the healing thereof. Essentially, step 540 is the repeated execution of steps 520 and 530.

After the surgeon has determined that the skin has adequately expanded, the surgeon can then start executing step 550 of closing the wound. In one embodiment, the skin expanding system is removed before the surgeon closes the wound using another set of suture (as illustrated in FIG. 8). In another embodiment, the surgeon can use the existing expanding devices to maintain the tension in the skin to minimize the wound dehiscence (as illustrated in FIG. 9). The surgeon can then remove the skin expanding system once he/she is confident that the wound is properly closed.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures may be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. An expanding device having a first side and an opposite second side, the first side configured to contact skin, the expanding device comprising:
   an elongated and straight body;
   a plurality of holes formed along a length of the body and including a first hole and a second hole, wherein each of the holes has a first opening formed on the first side and a second opening formed on the second side;
   a plurality of grooves, wherein the groove is formed between two adjacent holes;
   a plurality of teeth portions disposed on at least a portion of the body between each of the plurality of holes and protruding away from a first side of the body and a second side of the body; and
   one end of a suture can enter the first hole from the first side, exit the first hole from the second side, be rested on portions the body in at least one of the grooves, enter the second hole from the second side, and exit the second hole from the first side,
   a user can pull two ends of the suture to move the expanding device toward the user.

2. The expanding device of claim 1, wherein the grooves each includes a pair of curved corners formed on two opposite ends of the groove, the curved corner is adjacent to one of the holes.

3. The expanding device of claim 1, comprising a plurality of funnel portions adjacent to one of the openings, wherein two of the funnel portions are formed at two opposite ends of the holes.

4. The expanding device of claim 1, wherein each of the plurality of teeth portions are disposed around each of the plurality of grooves.

5. The expanding device of claim 1, further comprising a center plane, wherein first side and the second side are symmetrical with respect to the center plane.

6. A method of expanding skin adjacent to an open wound, comprising:
   providing a first expanding device and a second expanding device, the expanding devices each including:
   an elongated and straight body;
   a plurality of holes formed along a length of the body and including a first hole and a second hole, wherein the holes each has a first hole formed on the first side and a second hole formed on the second side;
   a plurality of grooves, wherein the groove is formed between two adjacent holes; and
   a plurality of teeth portions disposed on at least a portion of the body between each of the plurality of holes and protruding away from a first side of the body and a second side of the body:
   placing the first and second expanding devices on the skin and on two opposite sides of the wound;
   coupling the first expanding device, the skin, and the second expanding device with a suture;
   expanding the skin by pulling the suture to bring the expanding devices toward each other, wherein the expanding devices distribute pulling forces from the suture over the skin and bring the skin toward each other; and
   releasing the suture to allow the skin to relax.

7. The method of expanding skin of claim 6 further comprising:
   forming curved corners on two opposite ends of the groove, wherein the curved corner is adjacent to one of the holes;
   bending the suture around the curved corners adjacent to the first hole of the second expanding device;
   placing the suture on the body of the second expanding device and within at least one of the grooves; and
   bending the suture around the curved corners adjacent to the second hole of the second expanding device.

8. The method of expanding skin of claim 6, further comprising forming funnel portions on the first and second expanding devices, wherein two of the funnel portions are formed near two opposite ends of the hole.

9. The method of expanding skin of claim 6, wherein each of the plurality of teeth portions are disposed around each of the plurality of grooves; the step of pulling the suture further includes forcing the plurality of teeth portions into the skin to prevent the expanding devices from slipping off the tissue.

10. The method of expanding skin of claim 6, wherein the step of coupling skin with the expanding devices includes:
- coupling the suture with a needle;
- passing the suture through the first hole of the first expanding device;
- piercing the skin adjacent to the first expanding device with the needle and moving the suture across the wound;
- piercing the skin adjacent to the second expanding device with the needle;
- passing the suture through the first and second holes of the second expanding device;
- piercing the skin adjacent to the second expanding device with the needle and moving the suture across the wound back to the first expanding device;
- piercing the skin adjacent to the first expanding device with the needle; and
- passing the suture through the second hole of the first expanding device.

11. The method of expanding skin of claim 6, wherein the step of expanding the skin includes:
- passing through two ends of the suture through an opening of a washer to group the two ends into a string; and
- pulling the two ends of the string.

12. The method of expanding skin of claim 6, further comprising clamping the suture to maintain a tension of the suture and a distance between the first and second expanding devices for a predetermined period of time.

13. A method of closing an open wound, comprising:
- providing a first expanding device and a second expanding device, the expanding devices each comprising:
  - an elongated and straight body;
  - a plurality of holes formed along a length of the body and including a first hole and a second hole, wherein the holes each has a first hole formed on the first side and a second hole formed on the second side;
  - a plurality of grooves, wherein one of the grooves is formed between two adjacent holes; and
  - a plurality of teeth portions disposed on at least a portion of the body between each of the plurality of holes and protruding away from a first side of the body and a second side of the body;
- placing the expanding devices on two opposite sides of the wound;
- coupling the first expanding device, the skin, and the second expanding device with a suture;
- expanding the skin by pulling the suture to bring the expanding devices toward each other, wherein the expanding devices attaches to the skin adjacent to the wound and expands the skin under a pulling force from the suture; and
- releasing the suture to allow the skin to relax;
- repeatedly tensioning and releasing the suture to respectively expanding and relaxing the skin for a number of times to elongate the skin; and
- closing the wound.

14. The method of closing the open wound of claim 13 further comprising:
- forming curved corners on two opposite ends of the groove, wherein the curved corner is adjacent to one of the holes;
- bending the suture around the curved corners adjacent to the first hole of the second expanding device;
- placing the suture on the body of the second expanding device and within at least one of the grooves; and
- bending the suture around the curved corners adjacent to the second hole of the second expanding device.

15. The method of closing the open wound of claim 13 further comprising forming funnel portions on the first and second expanding devices, wherein two of the funnel portions are formed near two opposite ends of the hole.

16. The method of closing the open wound of claim 13, wherein each of the plurality of teeth portions are disposed around each of the plurality of grooves, the step of pulling the suture further includes forcing the plurality of teeth portions into the skin to prevent the expanding devices from slipping off the tissue.

17. The method of closing the open wound of claim 13, wherein the step of coupling skin with the expanding devices includes:
- coupling the suture with a needle;
- passing the suture through the first hole of the first expanding device;
- piercing the skin adjacent to the first expanding device with the needle and the suture and moving the suture across the wound;
- piercing the skin adjacent to the second expanding device with the needle and the suture;
- passing the suture through the first hole of the second expanding device and the second hole of the second expanding device;
- piercing the skin adjacent to the second expanding device with the needle and the suture and moving the suture across the wound;
- piercing the skin adjacent to the first expanding device with the needle; and
- passing the suture through the second hole of the first expanding device.

18. The method of expanding skin of claim 13, wherein the step of expanding the skin includes:
- passing through two ends of the suture through an opening of a washer to group the two ends into a string; and
- pulling the two ends of the string.

19. The method of closing the open wound of claim 13, further comprising clamping the suture to maintain a tension of the suture and a distance between the expanding devices for a predetermined period of time.

20. The method of closing the open wound of claim 13, wherein the step of closing the wound includes removing the first and second expanding devices from the skin.

* * * * *